US009457467B2

(12) United States Patent
Fujimoto et al.

(10) Patent No.: US 9,457,467 B2
(45) Date of Patent: Oct. 4, 2016

(54) CONTROL DEVICE, CONTROL METHOD AND CONTROL PROGRAM

(71) Applicants: Hiroshi Fujimoto, Tokyo (JP); Kenji Inukai, Tokyo (JP); Taro Takahashi, Tokyo (JP)

(72) Inventors: Hiroshi Fujimoto, Tokyo (JP); Kenji Inukai, Tokyo (JP); Taro Takahashi, Tokyo (JP)

(73) Assignees: THE UNIVERSITY OF TOKYO, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/628,860

(22) Filed: Feb. 23, 2015

(65) Prior Publication Data
US 2015/0251313 A1    Sep. 10, 2015

(30) Foreign Application Priority Data

Mar. 7, 2014    (JP) .................. 2014-045472

(51) Int. Cl.
*B25J 9/16* (2006.01)
*G05B 13/02* (2006.01)
*G05B 11/36* (2006.01)

(52) U.S. Cl.
CPC ............... *B25J 9/163* (2013.01); *G05B 11/36* (2013.01); *G05B 13/02* (2013.01)

(58) Field of Classification Search
CPC ......... B25J 9/163; G05B 13/02; G05B 11/36
See application file for complete search history.

(56) References Cited

U.S. PATENT DOCUMENTS

| 4,868,472 A * | 9/1989 | Daggett ............ G05B 19/4141 318/567 |
| 5,929,700 A | 7/1999 | Fuller et al. |
| 2013/0310949 A1* | 11/2013 | Goldfarb ................ A61F 2/68 623/27 |

FOREIGN PATENT DOCUMENTS

| JP | H10-78801 A | 3/1998 |
| JP | 11184503 A * | 7/1999 |
| JP | 2006-297553 A | 11/2006 |
| JP | 2013-219884 A | 10/2013 |
| JP | 2014-164498 A | 9/2014 |

OTHER PUBLICATIONS

Aoki, Motonobu et al., "Robust Resonance Suppression Control of Humanoid Robot using Self Resonance Cancellation Control and Self Resonance Cancellation Disturbance Observer for N-Inertia System," Mar. 7, 2013, pp. 1-5.
Aoki, Motonobu et al., "Robust Control of Two-Inertia System Based on Self Resonance Cancellation Disturbance Observer and Application to Humanoid Robot," The Institute of Electrical Engineers of Japan, Sep. 4, 2012, pp. 46-55.

* cited by examiner

*Primary Examiner* — Rodney Butler
(74) *Attorney, Agent, or Firm* — Oliff PLC

(57) ABSTRACT

A control device includes a main actuator configured to drive a plant through a torque transfer device disposed on a driving side, a load side sub-actuator configured to drive the plant that is disposed on a plant side, and a processor configured to: generate a torque reference input value driving the main actuator and the load side sub-actuator, and cancel out resonance by multiplying the generated torque reference input value by: a first gain including an inertia coefficient, a viscosity coefficient, and a reduction ratio of the torque transfer device on the driving side and on the plant side, and a second gain including: the inertia coefficient, the viscosity coefficient, and the reduction ratio of the torque transfer device on the driving side and on the plant side, and thereby adjusting a ratio of the torque reference input value of the main actuator and the load side sub-actuator.

16 Claims, 18 Drawing Sheets

| $J_M$ | kg · m² | $8.0 \times 10^{-6}$ |
|---|---|---|
| $B_M$ | N · m/(rad/s) | $5.0 \times 10^{-4}$ |
| $J_L$ | kg · m² | $2.2 \times 10^{-5}$ |
| $B_L$ | N · m/(rad/s) | $1.8 \times 10^{-3}$ |
| $K$ | N · m/(rad) | 0.30 |
| $r$ | | 2.0 |

Fig. 14

CONTROL DEVICE, CONTROL METHOD AND CONTROL PROGRAM

INCORPORATION BY REFERENCE

This application is based upon and claims the benefit of priority from Japanese patent application No. 2014-045472, filed on Mar. 7, 2014, the disclosure of which is incorporated herein in its entirety by reference.

BACKGROUND OF THE INVENTION

1. Field of the Invention

The present invention relates to a control device, a control method and a control program that control driving of a plant by using two driving means.

2. Description of Related Art

As aging population and declining birthrate grow into a serious problem, use of a robot as a labor force that can take the place of human labor attracts attentions. A transmission mechanism of a humanoid robot or the like, for example, is less rigid, and therefore resonance occurs at low frequencies. The control bandwidth cannot be high, which makes it difficult to achieve further improvement of moving performance. It is thus important to install resonance suppression control into such a robot or the like.

In this regard, a control device that includes a plurality of detection means which respectively detect information on the driving side and on the plant side and performs self resonance cancellation control that cancels out resonance by driving the driving means based on the information detected by each of the detection means is known (see Motonobu Aoki, Hiroshi Fujimoto, Yoichi Hori and Taro Takahashi, "Robust Resonance Suppression Control of Humanoid Robot using Self Resonance Cancellation Control and Self Resonance Cancellation Disturbance Observer for n-inertia System", for example).

However, the above-described control device performs resonance cancellation by driving a plant using one driving means and does not perform resonance cancellation by driving a plant using two driving means.

SUMMARY OF THE INVENTION

The present invention has been accomplished to solve the above problem and an object of the present invention is thus to provide a control device, a control method and a control program capable of resonance cancellation by driving a plant using two driving means.

To achieve the above object, one aspect of the present invention is a control device including first driving means for driving a plant through torque transfer means, placed on a driving side that drives the plant; second driving means for driving the plant, placed on a plant side; reference input generation means for generating a torque reference input value for driving the first and second driving means; and resonance cancellation means for canceling out resonance by multiplying the torque reference input value generated by the reference input generation means by a first gain including an inertia coefficient, a viscosity coefficient and a reduction ratio of the torque transfer means on the driving side and on the plant side and multiplying the torque reference input value by a second gain including the inertia coefficient, the viscosity coefficient and the reduction ratio of the torque transfer means on the driving side and on the plant side, and thereby adjusting a ratio of the torque reference input value for the first and second driving means.

In this aspect, the resonance cancellation means may cancel out resonance by multiplying the torque reference input value generated by the reference input generation means by each of a first gain ($\alpha+\beta/s$) and a second gain ($\gamma+\delta/s$) and thereby adjusting a ratio of the torque reference input value for the first and second driving means.

In this aspect, the resonance cancellation means may include a first filter for extracting a high-frequency component from the torque reference input value generated by the reference input generation means and a second filter for extracting a low-frequency component from the torque reference input value generated by the reference input generation means, may control the first and second driving means by canceling out resonance by multiplying the high-frequency torque reference input value extracted by the first filter by each of the first and second gains and thereby adjusting the torque reference input value, and may control the first driving means further by using the low-frequency torque reference input value extracted by the second filter.

In this aspect, the resonance cancellation means may include a first filter for extracting a high-frequency component from the torque reference input value generated by the reference input generation means and a second filter for extracting a low-frequency component from the torque reference input value generated by the reference input generation means, may control the first and second driving means by canceling out resonance by multiplying the high-frequency torque reference input value extracted by the first filter by each of a first gain ($\alpha_v+\beta_v/s$) and a second gain ($\gamma_v+\delta_v/s$) and thereby adjusting the torque reference input value and control the first driving means based on the low-frequency torque reference input value extracted by the second filter, and may adjust a parameter $\alpha_v$ ($0 \le \alpha_v \le 1$) and set parameters $\beta_v$, $\gamma_v$ and $\delta_v$ based on the adjusted parameter $\alpha_v$ by using following expressions:

In this aspect, the first filter may be a high-pass filter ($1-F(s)$), and the second filter may be a low-pass filter ($F(s)$).

In this aspect, after setting the parameter $\alpha_v$, the resonance cancellation means may adjust and set a cutoff frequency of the first and second filters based on the set parameter $\alpha_v$.

In this aspect, the plant may be a joint of a robot.

To achieve the above object, one aspect of the present invention is a control method of a control device including first driving means for driving a plant through torque transfer means, placed on a driving side that drives the plant, and second driving means for driving the plant, placed on a plant side, the method including a step of generating a torque reference input value for driving the first and second driving means; and a step of canceling out resonance by multiplying the generated torque reference input value by a first gain including an inertia coefficient, a viscosity coefficient and a reduction ratio of the torque transfer means on the driving side and on the plant side and multiplying the torque reference input value by a second gain including the inertia coefficient, the viscosity coefficient and the reduction ratio of the torque transfer means on the driving side and on the plant side, and thereby adjusting a ratio of the torque reference input value for the first and second driving means.

In this aspect, the canceling step may cancel out resonance by multiplying the generated torque reference input value by each of a first gain ($\alpha+\beta/s$) and a second gain ($\gamma+\delta/s$) and thereby adjusting a ratio of the torque reference input value for the first and second driving means.

In this aspect, the control method may further include a step of extracting a high-frequency component from the generated torque reference input value using a first filter, and a step of extracting a low-frequency component from the generated torque reference input value using a second filter, and the canceling step may control the first and second driving means by canceling out resonance by multiplying the extracted high-frequency torque reference input value by each of the first and second gains and thereby adjusting the torque reference input value and may control the first driving means further by using the extracted low-frequency torque reference input value.

In this aspect, the control method may further include a step of extracting a high-frequency component from the generated torque reference input value using a first filter, and a step of extracting a low-frequency component from the generated torque reference input value using a second filter, and the canceling step may control the first and second driving means by canceling out resonance by multiplying the extracted high-frequency torque reference input value by each of a first gain ($\alpha_v + \beta_v/s$) and a second gain ($\gamma_v + \delta_v/s$) and thereby adjusting the torque reference input value and control the first driving means based on the extracted low-frequency torque reference input value, and may adjust a parameter $\alpha_v$ ($0 \leq \alpha_v \leq 1$) and set parameters $\beta_v$, $\gamma_v$ and $\delta_v$ based on the adjusted parameter $\alpha_v$ by using following expressions:

In this aspect, the first filter may be a high-pass filter $(1-F(s))$, and the second filter may be a low-pass filter $(F(s))$.

In this aspect, after setting the parameter $\alpha_v$, the resonance cancellation means may adjust and set a cutoff frequency of the first and second filters based on the set parameter $\alpha_v$.

In this aspect, the plant may be a joint of a robot.

To achieve the above object, one aspect of the present invention is a control program of a control device including first driving means for driving a plant through torque transfer means, placed on a driving side that drives the plant, and second driving means for driving the plant, placed on a plant side, the program causing a computer to execute processing of generating a torque reference input value for driving the first and second driving means; and processing of canceling out resonance by multiplying the generated torque reference input value by a first gain including an inertia coefficient, a viscosity coefficient and a reduction ratio of the torque transfer means on the driving side and on the plant side and multiplying the torque reference input value by a second gain including the inertia coefficient, the viscosity coefficient and the reduction ratio of the torque transfer means on the driving side and on the plant side, and thereby adjusting a ratio of the torque reference input value for the first and second driving means.

According to the present invention, it is possible to provide a control device, a control method and a control program capable of resonance cancellation by driving a plant using two driving means.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 14 is a view showing one example of nominal values of a plant determined based on the frequency characteristics of FIG. 13;

DESCRIPTION OF THE EXEMPLARY EMBODIMENTS

First Embodiment

Embodiments of the present invention are described hereinafter with reference to the drawings.

Figure 1:
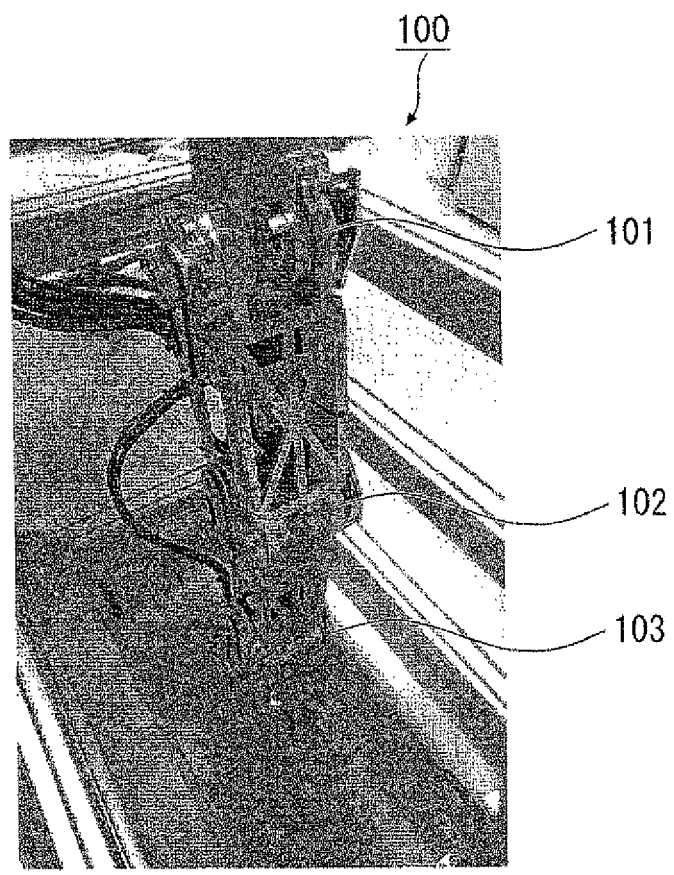
FIG. 1 is a view showing one example of a robot controlled by a control device according to a first embodiment of the invention.
Figure 2:
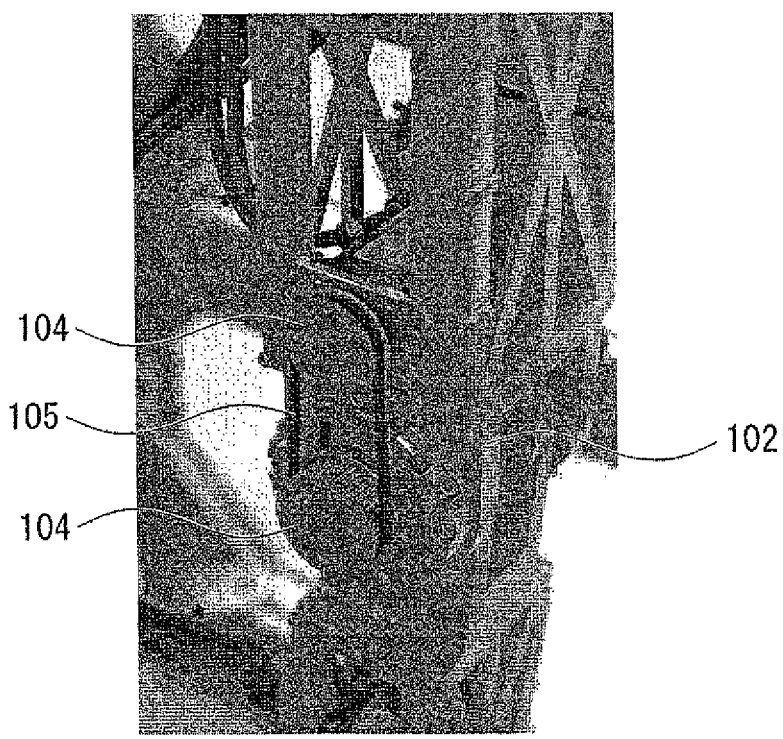
FIG. 2 is a view showing a structure of each joint.

FIG. 1 is a view showing one example of a robot that is controlled by a control device according to a first embodiment of the invention. The control device according to the first embodiment controls driving of a legged robot 100 having three joints, for example. The legged robot 100 has a hip joint 101, a knee joint 102, and an ankle joint 103. As shown in FIG. 2, each of the joints 101 to 103 is provided with a motor. Each motor is engaged with each of the joints 101 to 103 through harmonic gears 104 and a timing belt 105, for example.

Figure 3:
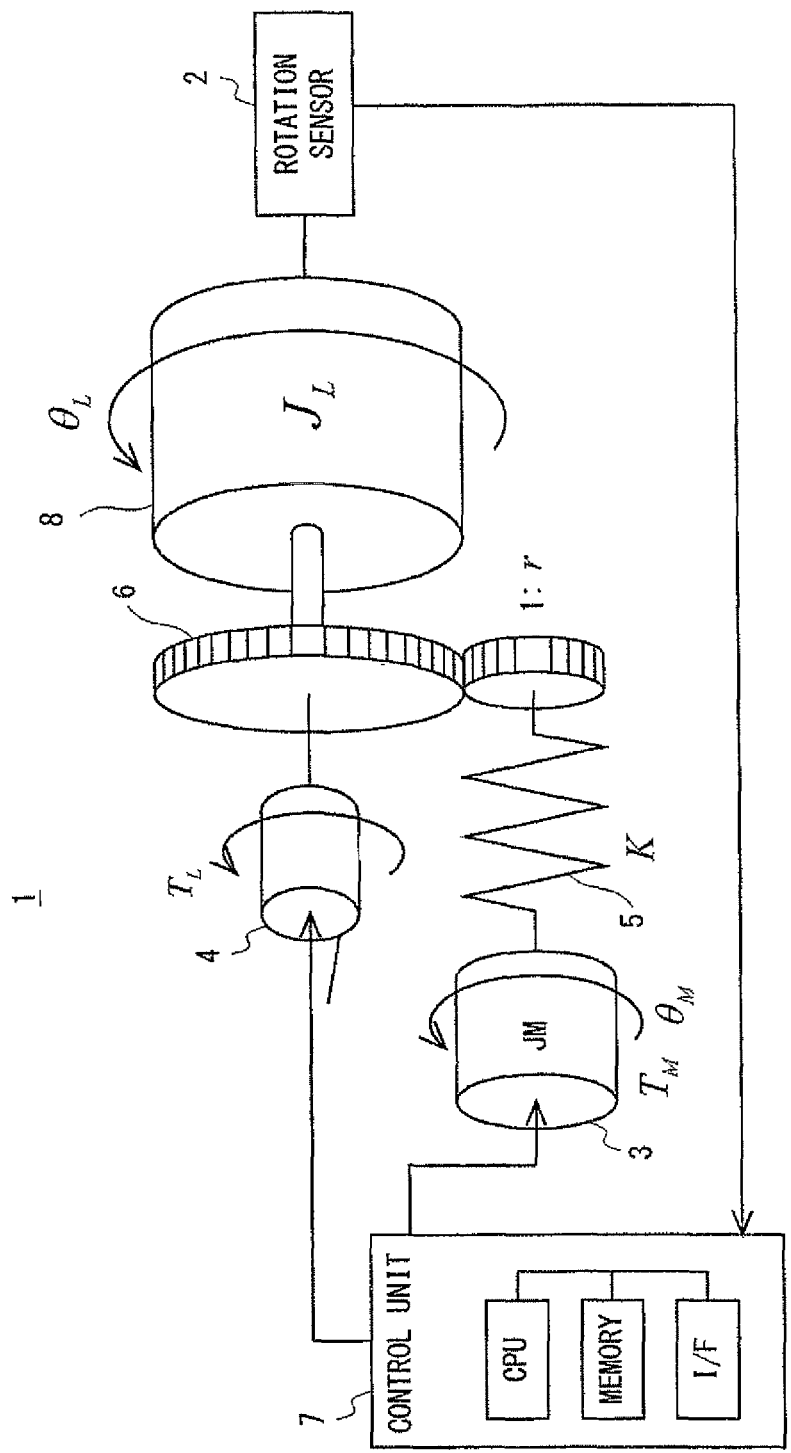
FIG. 3 is a view that models a two-inertia control device according to the first embodiment of the invention.

The control device according to the first embodiment controls driving of the above-described joints 101 to 103, which are plants. The control device is modeled as a two-inertia system in consideration of the characteristics of a spring element such as the timing belt 105, for example. FIG. 3 is a view that models a two-inertia control device according to the first embodiment.

A control device 1 according to the first embodiment includes a rotation sensor 2, a driving motor 3, a load motor 4, a spring element 5, a reduction gear 6, and a control unit 7.

The rotation sensor 2 is a potentiometer, a rotary encoder or the like that is placed for a load (joint) 8 or the load motor 4 and detects rotation information (rotation angle, rotation angular speed, rotation angular acceleration) of the load 8.

The rotation sensor 2 outputs the detected rotation information of the load 8 to the control unit 7.

The driving motor 3 is one specific example of first driving means, and it is placed on the driving side that drives the load 8. The driving motor 3 is engaged with the load 8 through the spring element 5 and the reduction gear 6 (one specific example of torque transfer means). The driving motor 3 drives the load 8 through the spring element 5 and the reduction gear 6.

The load motor 4 is one specific example of second driving means, and it is placed on the load side (plant side). The load motor 4 is joined to the reduction gear 6. The load 8 is directly joined to the load motor 4 through the reduction gear 6. In this way, the torque of the driving motor 3 is transferred to the load 8 after being reduced through the reduction gear 6. On the other hand, the torque of the load motor 4 is directly transferred to the load 8 without being reduced through the reduction gear 6.

Note that, in FIG. 3, T indicates a torque, ω indicates an angular speed, θ indicates a rotation angle, J indicates a moment of inertia, B indicates a viscosity friction coefficient, K indicates a spring constant of a spring element, and r indicates a reduction ratio of the reduction gear 6. The subscript M next to each of the parameters T, ω, θ, J and B indicates the driving side, and the subscript L indicates the load side. Note that a structure in which the reduction gear 6 does not carry out reduction (r=1) may be employed in this embodiment.

The control unit 7 performs feedback control of the driving motor 3 and the load motor 4 based on the rotation information from the rotation sensor 2, for example. The control unit 7 is configured as hardware of a microcomputer made up of a CPU (Central Processing Unit) 7a that performs computation, control and the like, a memory 7b composed of ROM (Read Only Memory) and RAM (Random Access Memory) that store a computation program, a control program and the like to be executed by the CPU 7a, an interface unit (I/F) 7c that inputs and outputs signals with an external device and the like, for example. The CPU 7a, the memory 7b and the interface unit 7c are connected with one another through a data bus or the like.

Figure 4:
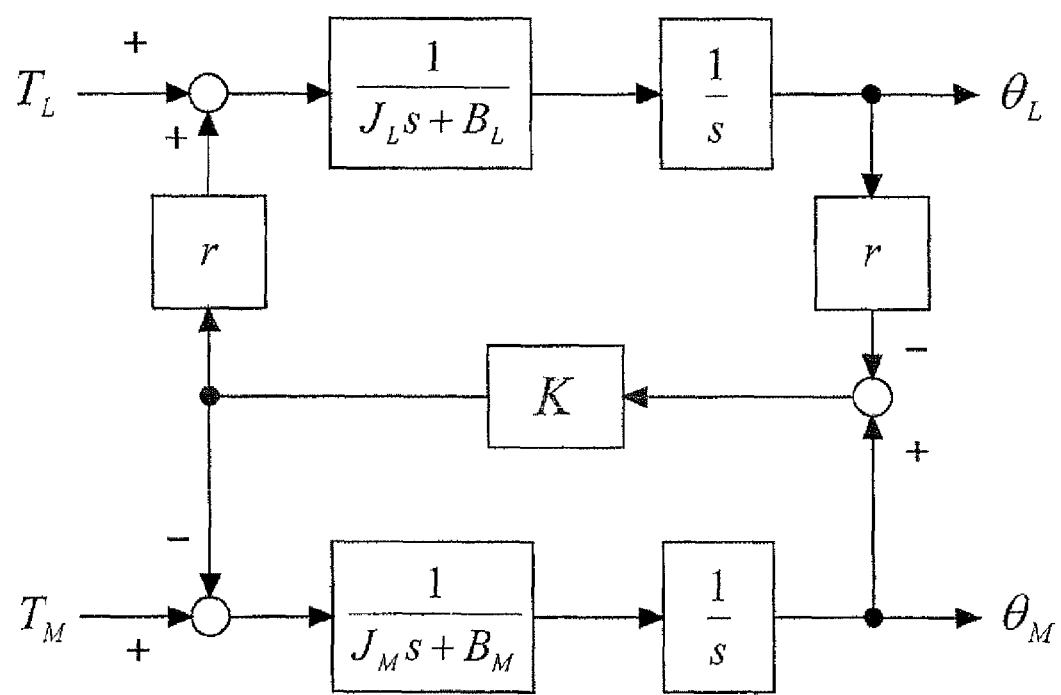
FIG. 4 is a block diagram showing a two-inertia control device.

A typical two-inertia control device is described hereinafter. FIG. 4 is a block diagram showing a two-inertia control device. The transfer function of the control device shown in FIG. 4 can be represented by the following expressions (1) to (5).

Note that the transfer function from the driving torque $T_M$ to the motor rotation angle $\theta_M$ is $P_{MM}$, the transfer function from the driving torque $T_M$ to the load rotation angle $\theta_L$ is $P_{LM}$, the transfer function from the load torque $T_L$ to the motor rotation angle $\theta_M$ is $P_{ML}$, the transfer function from the driving torque $T_L$ to the load rotation angle $\theta_L$ is $P_{LL}$. The variable "s" represents a Laplace variable in s-domain transfer functions.

Expression 1

$$P_{MM}(s) = \frac{\theta_M}{T_M} = \frac{J_L s^2 + B_L s + Kr^2}{D} \quad (1)$$

$$P_{LM}(s) = \frac{\theta_L}{T_M} = \frac{Kr}{D} \quad (2)$$

$$P_{ML}(s) = \frac{\theta_M}{T_L} = \frac{Kr}{D} \quad (3)$$

-continued $$P_{LL}(s) = \frac{\theta_L}{T_L} = \frac{J_M s^2 + B_M s + K}{D} \quad (4)$$

$$D = J_M J_L s^4 + (J_M B_L + J_L B_M)s^3 + (r^2 J_M K + J_L K + B_M B_L)s^2 + (r^2 B_M K + B_L K)s \quad (5)$$

From the above expressions, there are a resonant angular frequency $\omega_z$ represented by the following expression (6) from the denominator polynomial and an antiresonant angular frequency $\omega_p$ represented by the following expression (7) from the numerator polynomial, and thus resonance occurs in the two-inertia control device.

Expression 2

$$\omega_2 = \sqrt{K\left(\frac{r^2}{J_L} + \frac{1}{J_M}\right)} \quad (6)$$

$$\omega_p = \sqrt{\frac{Kr^2}{J_L}} \quad (7)$$

As described earlier, because a transmission mechanism of a humanoid robot or the like is less rigid, and resonance occurs at low frequencies. Accordingly, the control bandwidth cannot be high, which makes it difficult to achieve further improvement of moving performance. It is thus important to install resonance suppression control into such a robot or the like.

In this regard, the present applicant proposes resonance cancellation control (SRC: Self Resonance Cancellation) by a SIMO (Single Input Multiple Output) control device using one actuator and a plurality of sensors in Japanese Patent Application No. 2013-034706.

As a control system having duality with the above, the control device 1 according to the first embodiment is MISO (Multiple Input Single Output), and it performs resonance cancellation control (ARC: Actuation Resonance Cancellation) using a plurality of actuators. It is thereby possible to achieve oscillation suppression control and robust control against modeling errors, as in the case of SRC.

The control device 1 according to the first embodiment multiplies the torque reference input value for the driving and load motors 3 and 4 by a first gain including the inertia coefficient, the viscosity coefficient and the reduction ratio on the driving side and the load side, and multiplies the torque reference input value by a second gain including the inertia coefficient, the viscosity coefficient and the reduction ratio on the driving side and the load side. It is thereby possible to adjust the ratio of the torque reference input values for the driving and load motors 3 and 4 and cancel out subsynchronous resonance that occurs by the spring element 5.

In general, when subsynchronous resonance occurs by the spring element 5, the control bandwidth cannot be higher than the resonant frequency as described above. On the other hand, in the control device 1 according to the first embodiment, it is possible to increase the control bandwidth by canceling out subsynchronous resonance and thereby improve the control performance.

Figure 5:
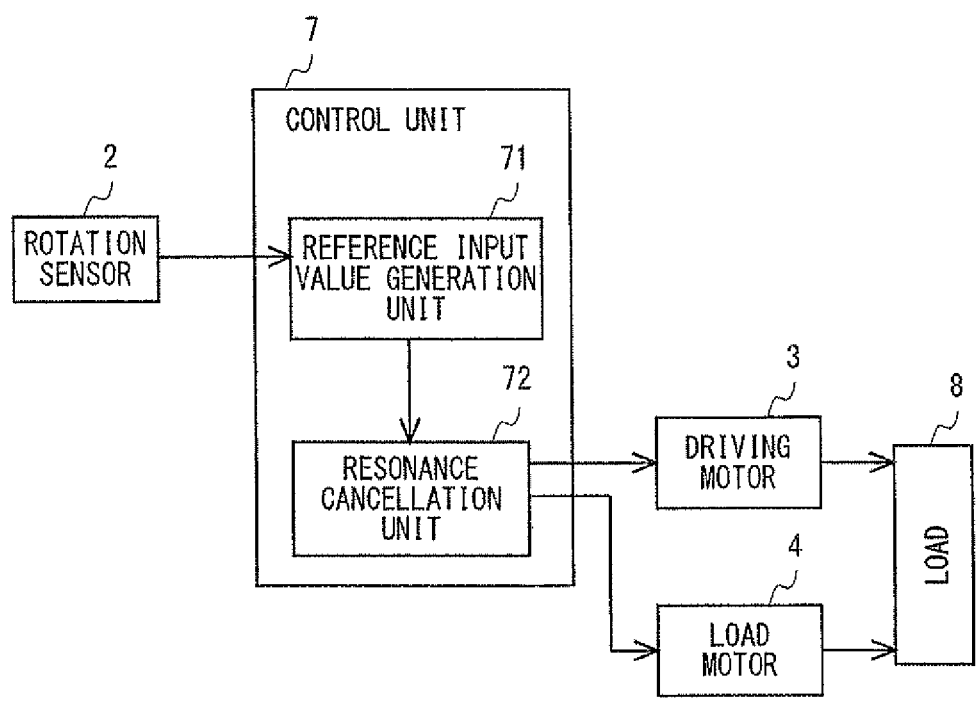
FIG. 5 is a block diagram showing a system configuration of the control device according to the first embodiment of the invention.

The control device 1 according to the first embodiment has the load motor 4 on the load side of the two-inertia system in addition to the driving motor 3 as shown in FIG. 3 and performs resonance cancellation control. FIG. 5 is a block diagram showing a system configuration of the control device according to the first embodiment. The control unit 7 according to the first embodiment includes a reference input value generation unit 71 that generates a torque reference input value and a resonance cancellation unit 72 that performs resonance cancellation control.

The reference input value generation unit 71 is one specific example of a reference input generation means, and it generates a torque reference input value for driving the driving motor 3 and the load motor 4 based on the rotation information from the rotation sensor 2. The reference input value generation unit 71 outputs the generated torque reference input value as an input torque $T_{in}$ to the resonance cancellation unit 72.

The resonance cancellation unit 72 is one specific example of a resonance cancellation means, and it multiplies the torque reference input value for the driving and load motors 3 and 4 by a first gain ($\alpha+\beta/s$) including the inertia coefficient, the viscosity coefficient and the reduction ratio, and multiplies the torque reference input value for the driving and load motors 3 and 4 by a second gain ($\gamma+\delta/s$) including the inertia coefficient, the viscosity coefficient and the reduction ratio, and thereby adjusts the ratio of the torque reference input values for the driving and load motors 3 and 4 and cancel out resonance.

Figure 6:
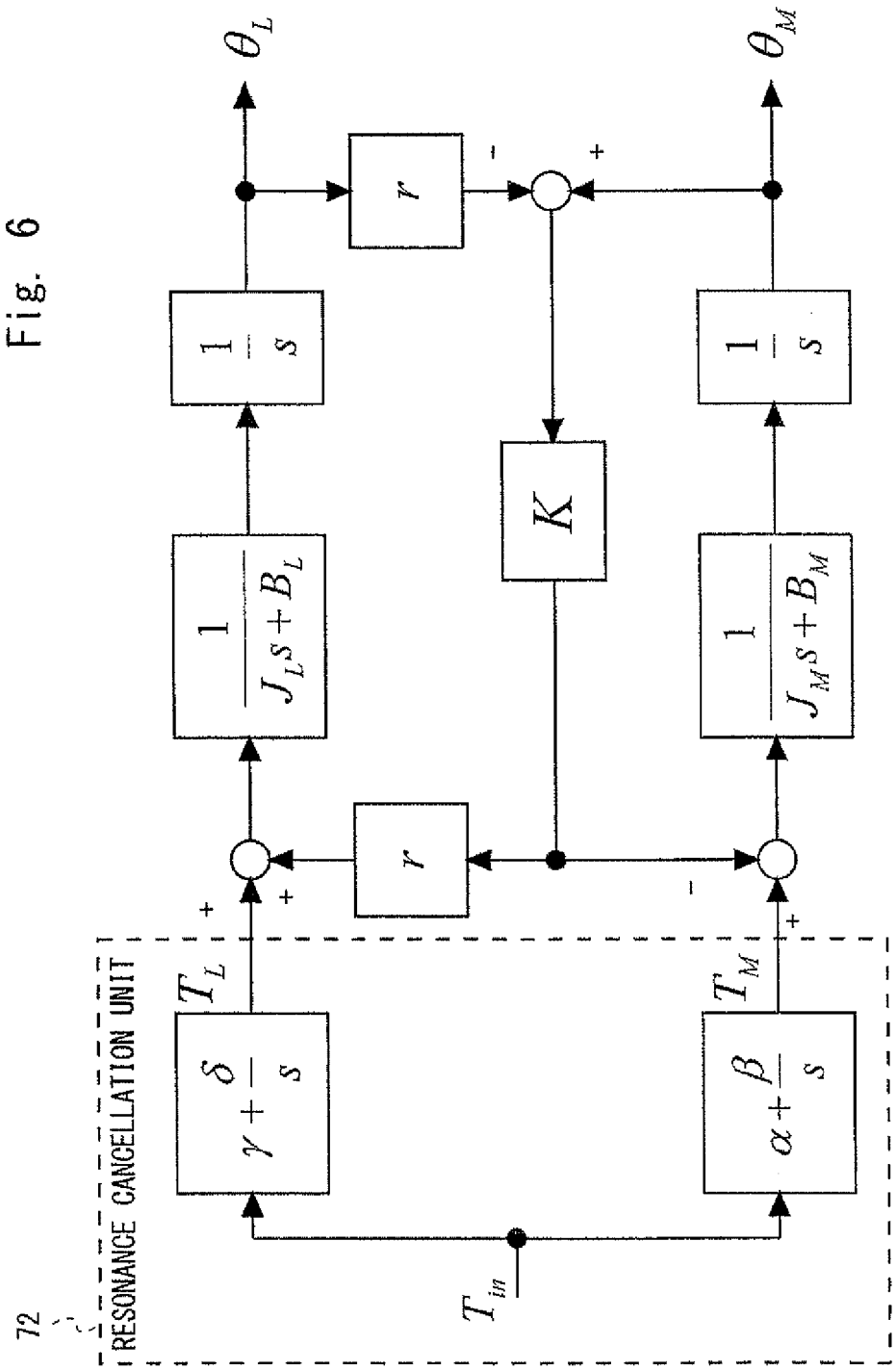
FIG. 6 is a block diagram of a resonance cancellation unit of the control device according to the first embodiment of the invention.

FIG. 6 is a block diagram of the resonance cancellation unit of the control device according to the first embodiment of the invention.

The resonance cancellation unit 72 multiplies the input torque $T_{in}$ from the reference input value generation unit 71 by the second gain ($\gamma+\delta/s$) and thereby calculates a load torque $T_L$.

In the plant model, a difference between the value obtained by multiplying the rotation angle $\theta_L$ of the load motor 4 by the reduction ratio r and the rotation angle $\theta_M$ of the driving motor 3 is calculated. The calculated difference is multiplied by the spring constant K and the reduction ratio r, and the result of the multiplication is added to the load torque $T_L$ that is calculated by the resonance cancellation unit 72. The result of the addition is multiplied by the first-order lag transfer function ($1/(J_L s+B_L)$), and integration is performed, and thereby the rotation angle $\theta_L$ of the load motor 4 is calculated.

Likewise, the resonance cancellation unit 72 multiplies the input torque $T_{in}$ from the reference input value generation unit 71 by the first gain ($\alpha+\beta/s$) and thereby calculates the driving torque $T_M$.

In the plant model, a difference between the value obtained by multiplying the rotation angle $\theta_L$ of the load motor 4 by the reduction ratio r and the rotation angle $\theta_M$ of the driving motor 3 is calculated. The calculated difference is multiplied by the spring constant K, and the result of the multiplication is subtracted from the driving torque $T_M$ that is calculated by the resonance cancellation unit 72. The result of the subtraction is multiplied by the first-order lag transfer function ($1/(J_M s+B_M)$), and integration is performed, and thereby the rotation angle $\theta_M$ of the driving motor 3 is calculated.

The transfer function of the control system shown in FIG. 6 can be represented by the following expressions (8) and (9).

Note that the transfer function from the input torque $T_{in}$ to the rotation angle $\theta_L$ of the load motor 4 is $P_L(s)$, and the transfer function from the input torque $T_{in}$ to the rotation angle $\theta_M$ of the driving motor 3 is $P_M(s)$.

Expression 3

$$P_L(s) = \frac{\theta_L}{T_{in}} = \left(\alpha + \frac{\beta}{s}\right)P_{LM}(s) + \left(\gamma + \frac{\delta}{s}\right)P_{LL}(s) \qquad (8)$$

$$P_M(s) = \frac{\theta_M}{T_{in}} = \left(\alpha + \frac{\beta}{s}\right)P_{MM}(s) + \left(\gamma + \frac{\delta}{s}\right)P_{ML}(s) \qquad (9)$$

The coefficients $\alpha$, $\beta$, $\gamma$ and $\delta$ are set to eliminate the resonance term from the above-described transfer functions $P_L(s)$ and $P_M(s)$. The coefficients $\alpha$, $\beta$, $\gamma$ and $\delta$ can be set as represented by the following expressions (10) to (13) without using the spring constant K.

Expression 4

$$\alpha = \frac{J_M}{J_M + \frac{J_L}{r^2}} \qquad (10)$$

$$\beta = \frac{B_M}{J_M + \frac{J_L}{r^2}} \qquad (11)$$

$$\gamma = \frac{J_L}{r\left(J_M + \frac{J_L}{r^2}\right)} \qquad (12)$$

$$\delta = \frac{B_L}{r\left(J_M + \frac{J_L}{r^2}\right)} \qquad (13)$$

In the above expressions, $\alpha$ is an apparent inertia ratio when viewed from the driving side, which takes a value from 0 to 1.

By setting the coefficients $\alpha$, $\beta$, $\gamma$ and $\delta$ as represented by the above expressions (10) to (13), the transfer function $P_L(s)$ from the input torque $T_{in}$ to the rotation angle $\theta_L$ of the load motor 4 and the transfer function $P_M(s)$ from the input torque $T_{in}$ to the rotation angle $\theta_M$ of the driving motor 3 can be represented by the following expressions (14) and (15), respectively. Thus, there is no resonance term in the transfer functions $P_L(s)$ and $P_M(s)$.

Expression 5

$$P_{L,ARC}(s) = \frac{\theta_L}{T_{in}} = \frac{1}{r\left(J_M + \frac{J_L}{r^2}\right)s^2} \qquad (14)$$

$$P_{M,ARC}(s) = \frac{\theta_M}{T_{in}} = \frac{1}{\left(J_M + \frac{J_L}{r^2}\right)s^2} \qquad (15)$$

As described above, the resonance cancellation unit 72 multiplies the torque reference input value by each of the first gain ($\alpha+\beta/s$) and the second gain ($\gamma+\delta/s$) based on $\alpha$, $\beta$, $\gamma$ and $\delta$ as set by the above expressions (10) to (13), and can thereby adjust the ratio of the torque reference input values for the driving motor 3 and the load motor 4 and cancel out resonance.

Note that, in the first embodiment, the load motor 4 directly drives the load 8. Specifically, it is applicable to both of the structure that directly drives the load 8 using the load motor 4 and requires speed reduction by the reduction gear 6 and the structure that directly drives the load 8 using the load motor 4 and does not require speed reduction by the reduction gear 6. Further, the coefficients α, β, γ and δ do not include the spring constant K. Therefore, the control device 1 according to the first embodiment has robustness against the spring constant K.

As described above, the control device 1 according to the first embodiment multiplies the torque reference input value for the driving and load motors 3 and 4 by the first gain including the inertia coefficient, the viscosity coefficient and the reduction ratio on the driving side and the load side, and multiplies the torque reference input value by the second gain including the inertia coefficient, the viscosity coefficient and the reduction ratio on the driving side and the load side. It is thereby possible to adjust the ratio of the torque reference input values for the driving and load motors 3 and 4 and cancel out resonance. It is thus possible to perform resonance cancellation by driving a plant using two actuators.

Second Embodiment

Figure 7:
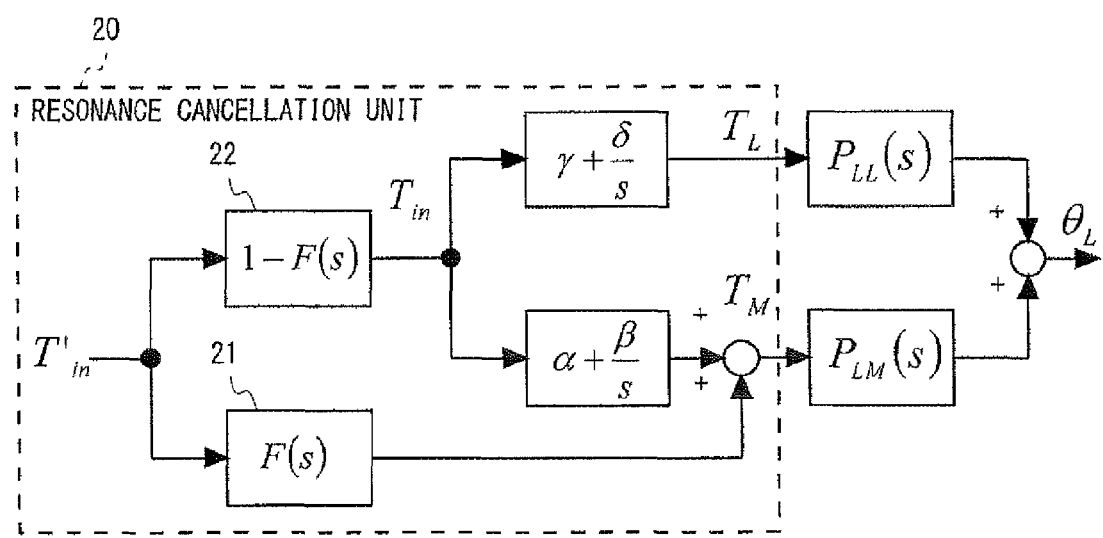
FIG. 7 is a block diagram of a resonance cancellation unit of a control device according to a second embodiment of the invention.

A control device according to a second embodiment of the invention performs resonance cancellation control with separating frequency of input torque (FS-ARC: Frequency Separation Actuation Resonance Cancellation). FIG. 7 is a block diagram of a resonance cancellation unit of the control device according to the second embodiment. A resonance cancellation unit 20 according to the second embodiment further includes a low-pass filter 21 and a high-pass filter 22 in addition to the elements of the resonance cancellation unit 72 according to the first embodiment described above.

The resonance cancellation unit 20 extracts a high-frequency component from the input torque T'$_{in}$ from the reference input value generation unit 71 by using the high-pass filter (1-F(s)) 22. The resonance cancellation unit 20 multiplies the high-frequency input torque T'$_{in}$ extracted by the high-pass filter 22 by each of the first gain (α+β/s) and the second gain (γ+δ/s), and calculates the load torque T$_L$ and the driving torque T$_M$, and thereby cancels out resonance and controls the driving motor 3 and the load motor 4.

The resonance cancellation unit 20 extracts a low-frequency component from the input torque T'$_{in}$ from the reference input value generation unit 71 by using the low-pass filter (F(s)) 21. The resonance cancellation unit 20 calculates the driving torque T$_M$ based on the low-frequency input torque extracted by the low-pass filter 21, and thereby controls the driving motor 3.

In FIG. 7, F(s) is a first-order low-pass filter with a cutoff frequency f$_{LPF}$[Hz], which is represented by the following expression (16).

Expression 6

$$F(s) = \frac{2\pi f_{LPF}}{s + 2\pi f_{LPF}} \tag{16}$$

Note that the above-described low-pass filter F(s) and the high-pass filter 1-F(s) are one examples, and the filter is not limited thereto. A second-order Butterworth filter or the like may be used in place of the above-described low-pass filter F(s), and an arbitrary filter having a function of extracting a low-frequency component and a high-frequency component from the torque reference input value just like the above-described low-pass filter F(s) and the high-pass filter 1-F(s) may be used.

The transfer function P$_{FS-ARC}$(s) from the input torque T'$_{in}$ to the rotation angle θ$_L$ of the load motor 4 can be represented by the following expression (17).

Expression 7

$$P_{FS-ARC}(s) = \frac{\theta_L}{T'_{in}} = F(s)P_{LM}(s) + \{1 - F(s)\}P_L(s) \tag{17}$$

The low-pass filter 21 and the high-pass filter 22 are configured as shown in FIG. 7. Thus, in the low-frequency region where resonance does not occur, the load 8 is driven by the motor torque of the driving motor 3 through the low-pass filter 21. On the other hand, in the relatively high-frequency region where resonance occurs, the load 8 is driven by the motor torque of the driving motor 3 and the load motor 4 through the high-pass filter 22, as performing resonance cancellation control.

In this second embodiment, the driving motor 3 drives by relatively low-frequency input torque, and the load motor 4 drives by relatively high-frequency input torque. The relatively high-frequency torque is torque that is likely to excite oscillation, and the relatively low-frequency torque is torque that is not likely to excite oscillation. Therefore, because the load motor 4 drives only for the torque that is likely to excite oscillation, a motor with a low rated power can be used for the load motor 4. With use of the low-output load motor 4, there is no need to use a large-scale motor, which leads to the size reduction of the robot.

Note that, in the second embodiment, the same elements as in the above-described first embodiment are denoted by the same reference symbols and not redundantly described in detail.

Third Embodiment

In the resonance cancellation control (which is referred to hereinafter as ARC) according to the first embodiment, resonance is cancelled out, and resonance mode from the input torque to the rotation angle on the load side is made unobservable. On the other hand, in resonance cancellation control (which is referred to hereinafter as FS-ARC) according to the second embodiment, resonance is not completely cancelled out, and thereby resonance mode is made observable, and oscillation due to disturbance can be also suppressed. It is thereby possible to prevent the occurrence of unexpected oscillation even when disturbance enters into the system.

In a third embodiment, α in the above expression (17) is a variable control parameter α$_v$ (0≤α$_v$≤1) that varies from 0 to 1. It is thereby possible to adjust the oscillation suppression effect of input to response and disturbance response. Using the variable control parameter α$_v$, β$_v$, γ$_v$ and δ$_v$ can be represented as the following expression (18) to (20).

Expression 8

$$\beta_V = \frac{B_M}{J_M}\alpha_V \tag{18}$$

$$\gamma_V = r(1 - \alpha_V) \tag{19}$$

$$\delta_V = \frac{B_L}{J_L}r(1 - \alpha_V) \tag{20}$$

Note that, when the variable control parameter α$_v$=α and the cutoff frequency f$_{LPF}$=0 (Hz), FS-ARC according to the third embodiment is equivalent to ARC according to the first embodiment described above.

Figure 8:
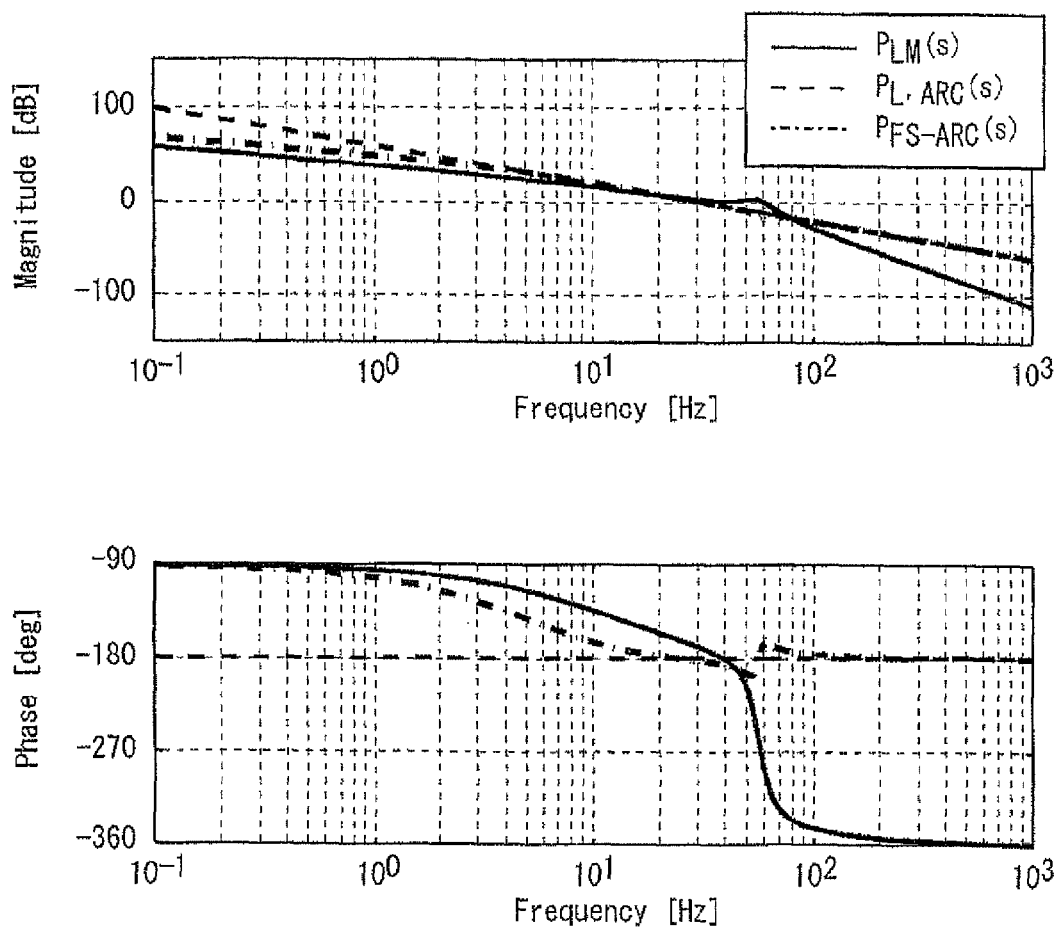
FIG. 8 is a Bode diagram of transfer functions $P_{LM}(s)$, $P_{L-ARC}(s)$ and $P_{FS-ARC}(c)$.

FIG. 8 is a Bode diagram of transfer functions $P_{LM}(s)$, $P_{L,ARC}(s)$ and $P_{FS\text{-}ARC}(c)$. In FS-ARC(s), the cutoff frequency $f_{LPF}$ of the low-pass filter F(s) is set to 5 (Hz), which is lower than 55 (Hz) where resonance occurs, for example.

As shown in FIG. 8, by applying ARC, resonance in the two-inertia system does not occur. In FS-ARC with separating frequency of input torque also, resonance does not substantially occur. Accordingly, resonance can be eliminated by applying ARC and FS-ARC. Further, the final phase of ARC and FS-ARC is −180 (deg), which is a system that is easy to control.

Next, a feedback control system is constructed for the FS-ARC system shown in FIG. 7. A feedback controller C(s) is designed for $P_{L,ARC}(s)$ that is made rigid. The feedback controller C(s) is designed so that the sensitivity function $S_{ARC}(s)=(1+P_{L,ARC}(s)C(s))^{-1}$ is stabilized.

The feedback controller C(s) is a PID controller, for example, and designed by pole placement. In this design, a pole of the sensitivity function $S_{ARC}(s)$ is set to 20 Hz by quadruple root placement. In FS-ARC according to the third embodiment, it is only necessary to design the controller for the rigid mode, and it is thus possible to easily determine the parameters of the controller.

The stability of the control system of FS-ARC according to the third embodiment is analyzed hereinbelow. Specifically, the stability of the control system of FS-ARC when the variable control parameter $\alpha_v$ and the cutoff frequency $f_{LPF}$, which are the parameters of the controller, are changed is analyzed.

Figure 9:
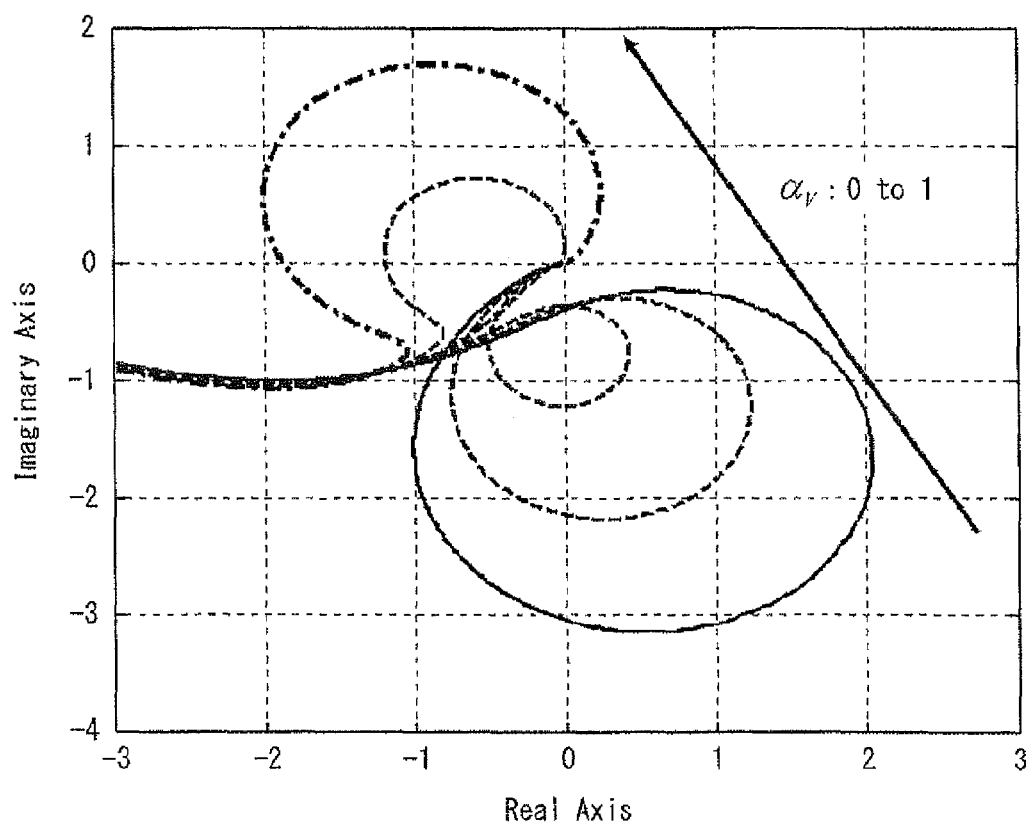
FIG. 9 is a Nyquist diagram when $f_{LPF}$ is fixed to 0 (Hz) and $\alpha_v$ is changed from 0 to 1.
Figure 10:
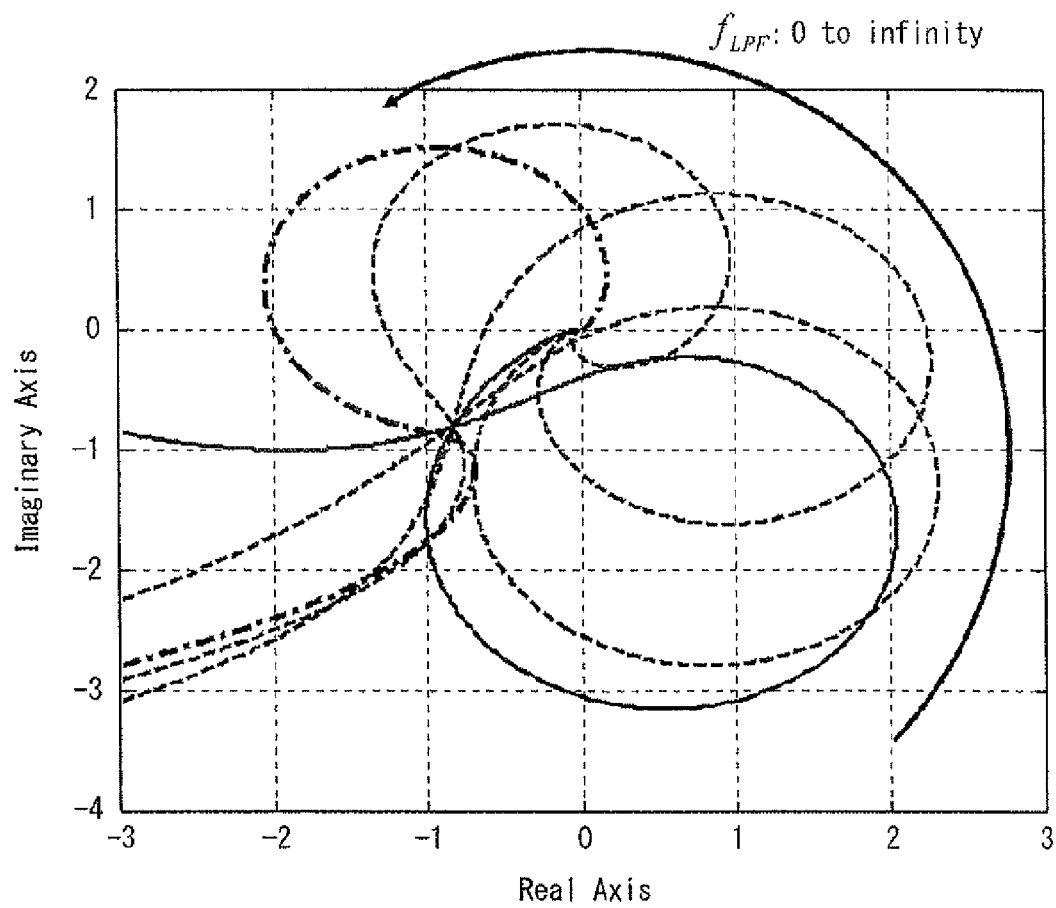
FIG. 10 is a Nyquist diagram when $f_{LPF}$ is fixed to 0 and $\alpha_v$ is changed from 0 to $\infty$.

FIG. 9 is a Nyquist diagram when the cutoff frequency $f_{LPF}$ is fixed to 0 (Hz) and the variable control parameter $\alpha_v$ is changed from 0 to 1. FIG. 10 is a Nyquist diagram when the cutoff frequency $f_{LPF}$ is fixed to 0 and the variable control parameter $\alpha_v$ is changed from 0 to ∞. In FIGS. 9 and 10, the solid line indicates the case where the variable control parameter $\alpha_v$=0 and the cutoff frequency $f_{LPF}$=0 (Hz). In this case, resonance mode of $P_{FS\text{-}ARC}(s)$ coincides with resonance mode of $P_{LL}(s)$. In FIG. 9, the dotted line indicates the case where the variable control parameter $\alpha_v$=1 and the cutoff frequency $f_{LPF}$=0 (Hz). In this case, resonance mode of $P_{FS\text{-}ARC}(s)$ coincides with resonance mode of $P_{LM}(s)$. In FIG. 10, the alternate long and short dashed line indicates the case where the variable control parameter $\alpha_v$=1 and the cutoff frequency $f_{LPF}$=∞. In this case, resonance mode of $P_{FS\text{-}ARC}(s)$ coincides with resonance mode of $P_{LM}(s)$.

In view of the above, in the Nyquist diagrams shown in FIGS. 9 and 10, the size and direction of the circle by resonance mode of $P_{FS\text{-}ARC}(s)$ can be freely set between resonance modes of $P_{LL}(s)$ and $P_{LM}(s)$. In other words, it is possible to easily adjust the resonance suppression effect and resonance mode phase stabilization by using the two parameters, the variable control parameter $\alpha_v$ and the cutoff frequency $f_{LPF}$.

For example, the oscillation suppression effect is adjusted first by the variable control parameter $\alpha_v$. Next, the phase stabilization of resonance mode is achieved by selecting the cutoff frequency $f_{LPF}$ so as to maximize the phase margin in the closed-loop system. To be more specific, the cutoff frequency $f_{LPF}$ is selected so as to set resonance mode as far away from the point −1+j0 as possible.

Next, the frequency characteristics of the above-described ARC and FS-ARC are evaluated by simulation. In this simulation, the following three conditions (Case 1-3) are established.

Case 1:
ARC is applied, the variable control parameter $\alpha_v$=α and the cutoff frequency $f_{LPF}$=0 (Hz), and a pole of the sensitivity function $S_{ARC}(s)$ is set to 30 (Hz).

Case 1 is the design with particular emphasis on suppression of oscillation of a response to the torque reference input value.

Case 2:
FS-ARC is applied, the variable control parameter $\alpha_v$=α and the cutoff frequency $f_{LPF}$=1.0 (Hz), and a pole of the sensitivity function $S_{ARC}(s)$ is set to 25 (Hz).

Case 2 is the design with particular emphasis on downsizing of the load motor 4.

Case 3:
FS-ARC is applied, the variable control parameter $\alpha_v$=0.1 and the cutoff frequency $f_{LPF}$=5.0 (Hz), and a pole of the sensitivity function $S_{ARC}(s)$ is set to 32 (Hz).

Case 3 is the design with particular emphasis on disturbance suppression capability.

Note that, in the above Case 1, the phase margin is 43.5°, and a pole of the sensitivity function $S_{ARC}(s)$ and the cutoff frequency $f_{LPF}$ are designed so that the phase margins of Case 2 and Case 3 are equal.

Figure 11:
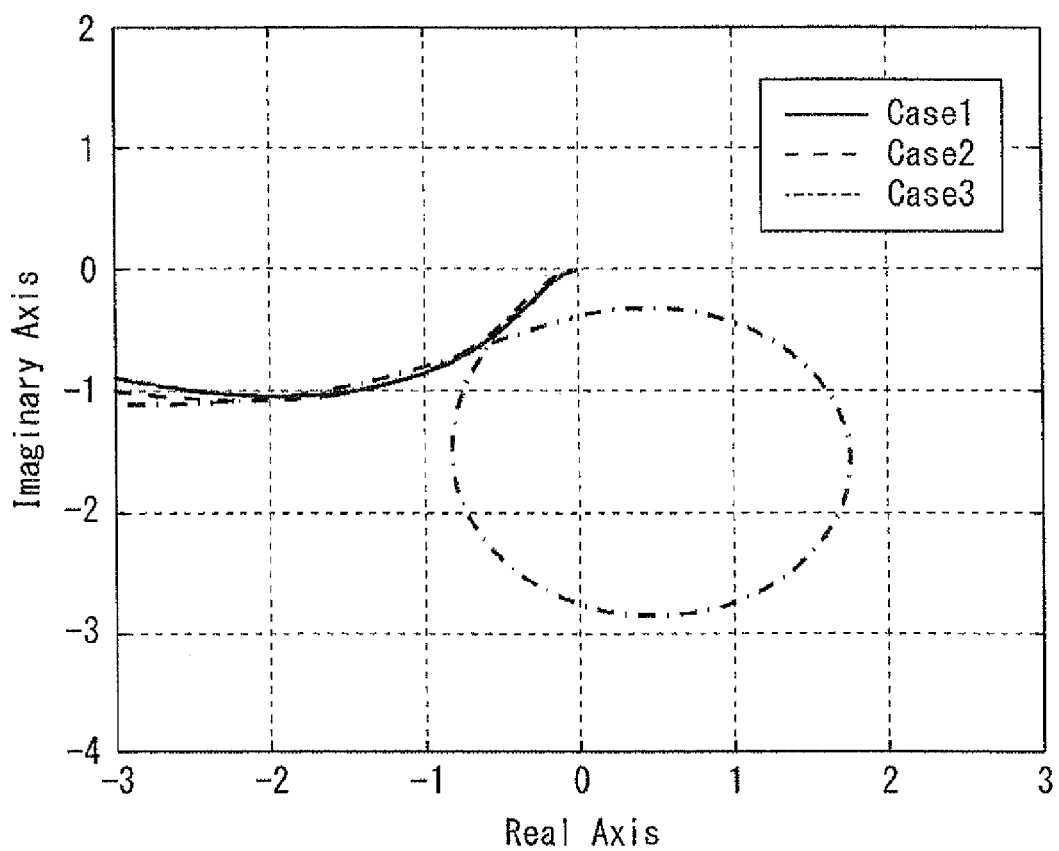
FIG. 11 is a Nyquist diagram when three conditions are established.

FIG. 11 is a Nyquist diagram when the above-described three conditions are established. As shown in FIG. 11, in Cases 1 and 2, resonance is canceled out. On the other hand, in Case 3, resonance mode is away from the point −1−j0 to achieve phase stabilization.

Figure 12:
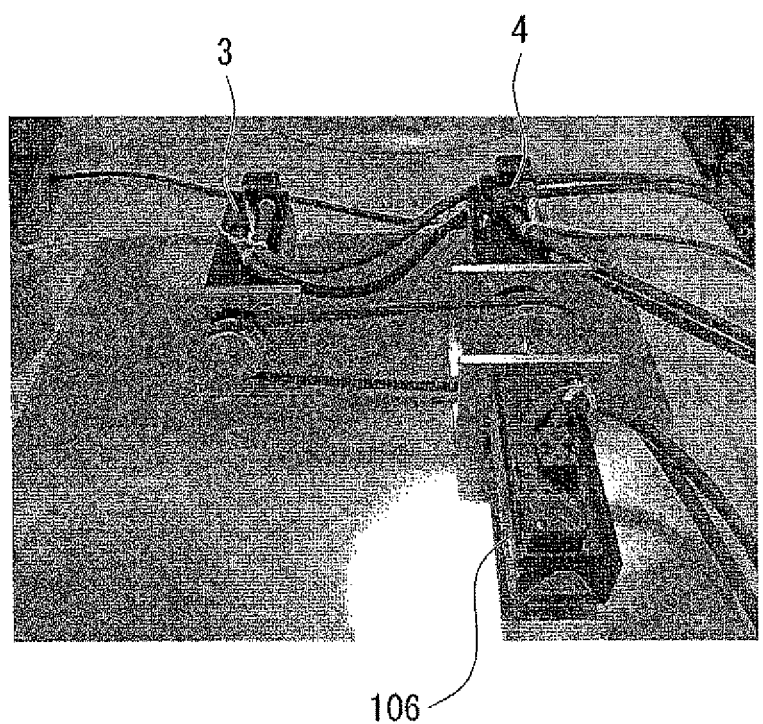
FIG. 12 is a view showing one example of an experimental apparatus.

Next, the frequency characteristics and the time response of ARC and FS-ARC are evaluated using an experimental apparatus. FIG. 12 is a view showing one example of an experimental apparatus. On the load side, a motor 106 for reproducing a load (joint) such as disturbance torque is placed.

Figure 13:
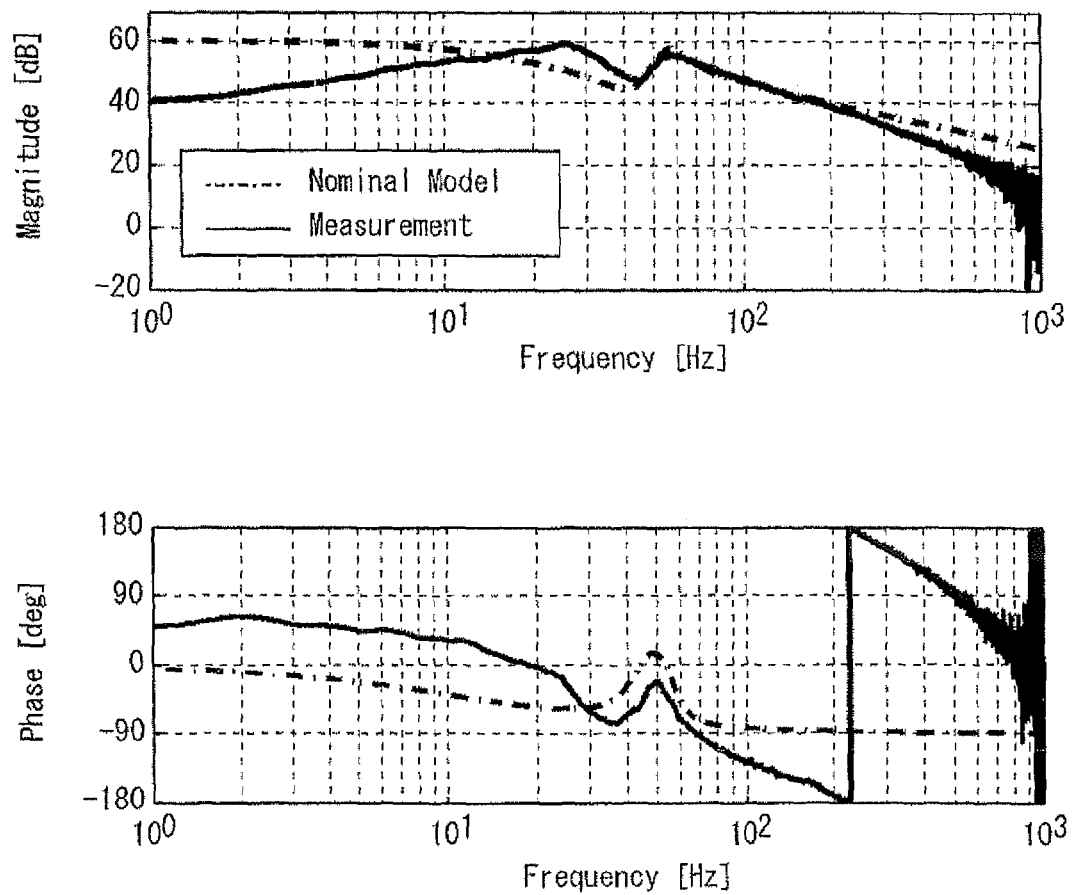
FIG. 13 is a Bode diagram of a measurement result of frequency characteristics and a two-inertia model by the measurement result.

FIG. 13 is a Bode diagram of a measurement result of frequency characteristics from the driving torque $T_M$ of the knee joint to the angular speed $\theta_M$ dot of the driving motor and a two-inertia model (FIG. 5) where model fitting is done based on the measurement result. FIG. 14 is a view showing one example of nominal values of a plant determined based on the frequency characteristics of FIG. 13. An error due to nonlinear friction occurs in the low-frequency gain.

In the experiment using the above experimental apparatus, three conditions (Case 1-3), which are the same as those in the above simulation, are established.

(1) Frequency Response

Figure 15:
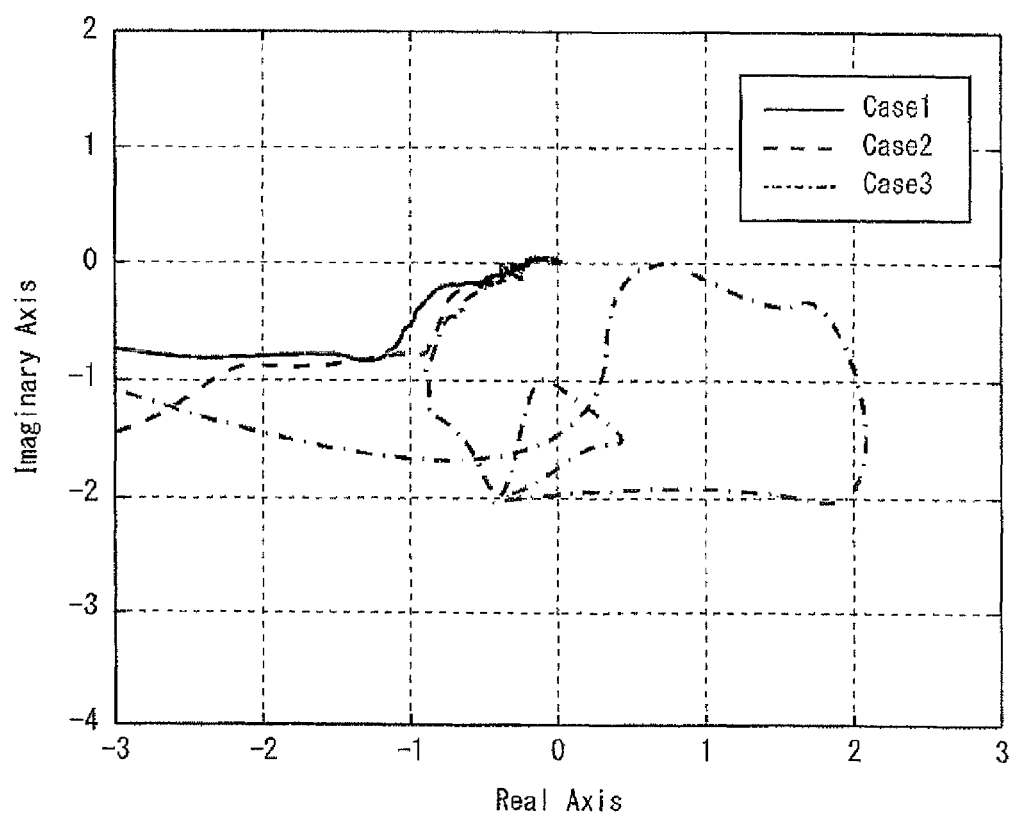
FIG. 15 is a Nyquist diagram measured using an experimental apparatus.

FIG. 15 is a Nyquist diagram measured using the experimental apparatus. As shown in FIG. 15, in Cases 1 and 2, resonance is substantially canceled out. On the other hand, in Case 3, resonance mode is away from the point −1+j0 to achieve phase stabilization. In Cases 1 to 3, there is the same tendency as in the above simulation result.

(2) Time Response

ARC and FS-ARC are evaluated by the time response of step-like reference input and step disturbance.

(2-1) Step Response

Figure 16:
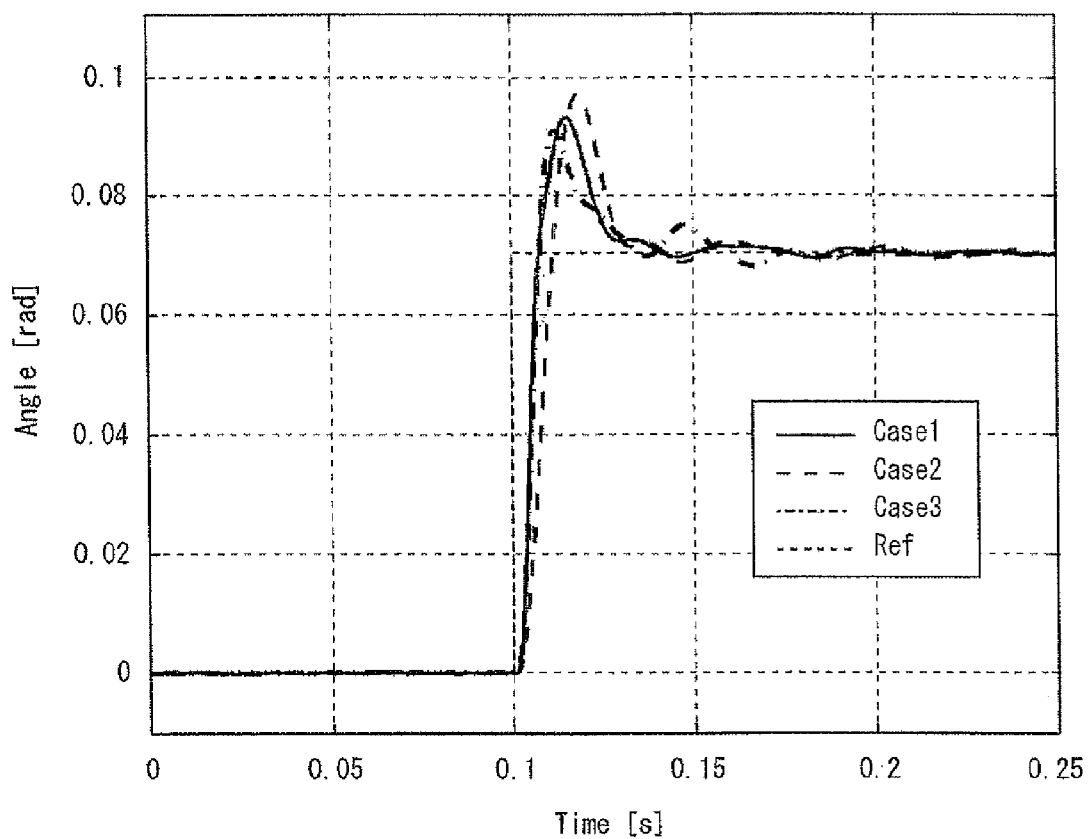
FIG. 16 is a view showing a step response waveform at a rotation angle of a load motor.

The step response of ARC and FS-ARC is evaluated. FIG. 16 is a view showing a step response waveform at a rotation angle of a load motor. As shown in FIG. 16, in Case 1, oscillation is suppressed. In Case 2 also, oscillation is suppressed. However, because a pole of the sensitivity function $S_{ARC}(s)$ is delayed, overshoot is larger than that in Case 1.

In Case 3 also, oscillation is suppressed. Although overshoot is smaller than that in Case 2, because the variable control parameter $\alpha_v \ne \alpha$, oscillation slightly remains.

Figure 17:
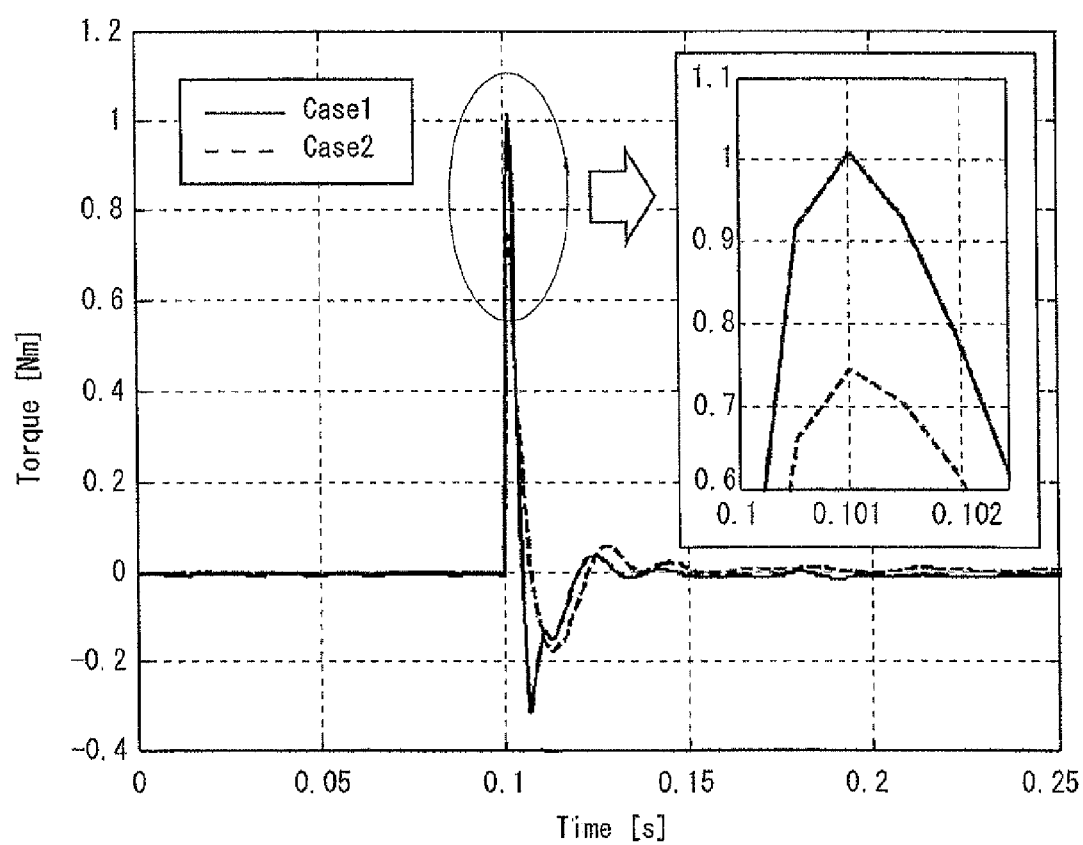
FIG. 17 is a view showing a torque waveform of a load motor in Cases 1 and 2 in a step response.

FIG. 17 is a view showing a torque waveform of the load motor in Cases 1 and 2 in a step response. As shown in FIG. 17, a torque peak in Case 2 is lower than a torque peak in Case 1 by 25%. Accordingly, by applying FS-ARC as in Case 2, it is possible to downsize the load motor 4.

(2-2) Disturbance Response

Figure 18:
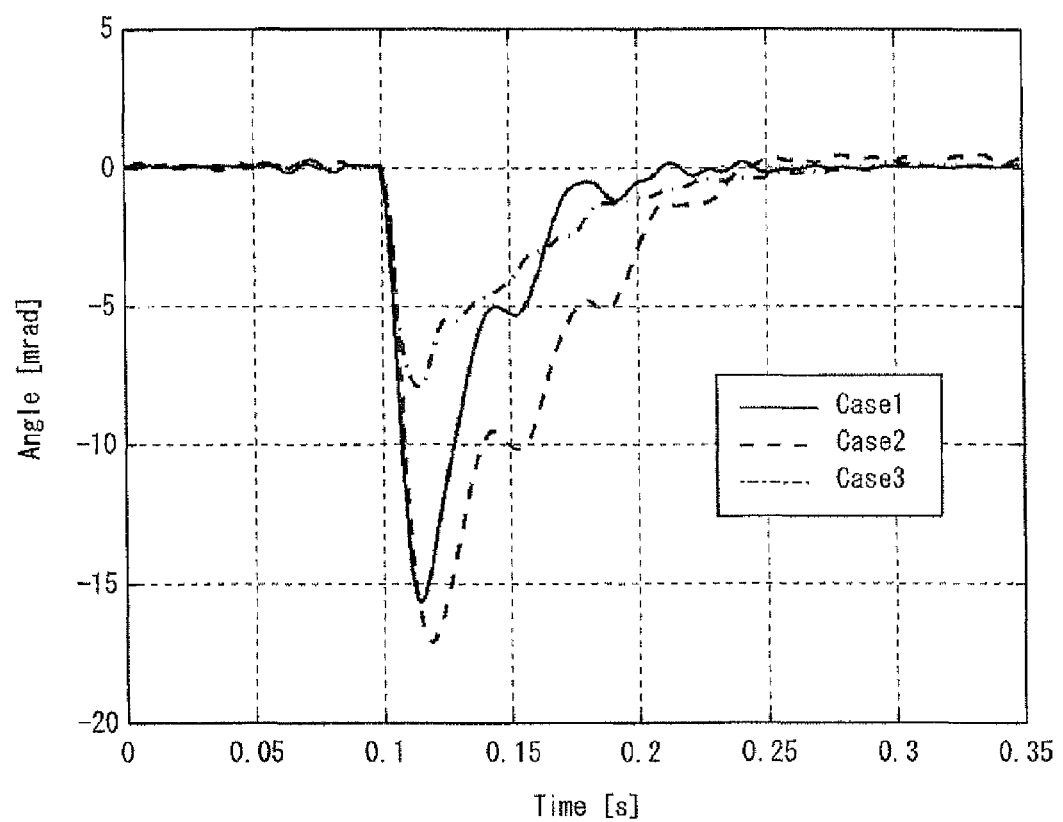
FIG. 18 is a view showing a disturbance response waveform at a rotation angle of a load motor.

The disturbance response of ARC and FS-ARC is evaluated. Step-like disturbance of 0.02 (N·m) is applied to the load side. At this time, the rotation angle $\theta_L$ of the load motor 4 is 0(rad). FIG. 18 is a view showing a disturbance response waveform at a rotation angle of the load motor. As shown in FIG. 18, the response in Cases 1 and 2 oscillates due to disturbance. On the other hand, in Case 3 where the variable control parameter $\alpha_v \neq \alpha$, the disturbance suppression effect is high, and oscillation is suppressed.

From the above experimental results, it is confirmed that Case 1 is the design with particular emphasis on response oscillation suppression to the torque reference input value, Case 2 is the design with particular emphasis on downsizing of the load motor 4, and Case 3 is the design with particular emphasis on disturbance suppression capability.

$\alpha_v$ that is used in the above expression (17) can be determined by balancing the tradeoff between the following (a) and (b).

(a) Place great importance on followability and oscillation characteristics to the torque reference input value (b) Place great importance on suppression characteristics for disturbance (disturbance suppression characteristics) and oscillation characteristics.

"Disturbance" indicates an external force acting to interfere with the operation of the robot, and "disturbance suppression characteristics" indicate the capability to keep following the torque reference input value without being affected by such a force.

In the case of placing the greatest importance on the above (a), the variable control parameter $\alpha_v$ is set to $\alpha_v = \alpha$ as described above. On the other hand, in the case of placing some importance on the above (b), adjustment is made with the variable control parameter $\alpha_v$ ($0 \le \alpha_v \le 1$).

For example, $\alpha_v$ that optimizes balance of the trade-off is set in consideration of the followability and oscillation characteristics to the torque reference input value from the step response waveform shown in FIG. 16 and the disturbance suppression characteristics and oscillation characteristics from the disturbance response waveform shown in FIG. 18. Note that, although $\alpha_v$ is set using FIGS. 16 and 18 showing the response waveform where the horizontal axis indicates time, it is not limited thereto. For example, $\alpha_v$ may be set using a response waveform by plotting the transfer function from load-side disturbance to output (rotation angle) or a response waveform by plotting the sensitivity function.

In this third embodiment, the same elements as in the above-described first and second embodiments are denoted by the same reference symbols and not redundantly described in detail.

It should be noted that the present invention is not limited to the above-described exemplary embodiment and may be varied in many ways within the scope of the present invention.

Although the control device 1 performs resonance cancellation control (ARC and FS-ARC) of a humanoid robot in the above-described embodiments, the present invention is not limited thereto. The control device 1 according to this embodiment may perform resonance cancellation control of a machine tool, for example. It is thereby possible to achieve high-torque, high-speed, and high-accuracy control using a plurality of motors. Further, the control device 1 may perform resonance cancellation control of a semiconductor fabrication device. It is thereby possible to reduce the effect of mechanical elasticity, which causes a problem in ultra-precise positioning. Furthermore, the control device 1 may perform resonance cancellation control for hybrid control of a vehicle engine and an electric motor. It is thereby possible to suppress subsynchronous resonance that occurs between the engine and the electric motor and achieve high-speed and high-accuracy control.

The present invention may be implemented by causing the CPU 7a to execute a computer program to perform the processing of the above-described resonance cancellation unit 72, for example.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.).

Further, the program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control device comprising:
   a main actuator configured to drive a plant through a torque transfer device disposed on a driving side;
   a load side sub-actuator configured to drive the plant, the load side sub-actuator being disposed on a plant side; and
   a processor configured to:
      generate a torque reference input value driving the main actuator and the load side sub-actuator;
      cancel out resonance by multiplying the generated torque reference input value by: (i) a first gain including: an inertia coefficient, a viscosity coefficient, and a reduction ratio of the torque transfer device on the driving side and on the plant side, and (ii) a second gain including: the inertia coefficient, the viscosity coefficient, and the reduction ratio of the torque transfer device on the driving side and on the plant side; and
      adjust a ratio of the torque reference input value of the main actuator and the load side sub-actuator based on the canceled out resonance.

2. The control device according to claim 1, wherein the processor is configured to: (i) cancel out resonance by multiplying the generated torque reference input value by each of a first gain ($\alpha + \beta/s$) and a second gain ($\gamma + \delta/s$), and (ii)

adjust a ratio of the torque reference input value of the main actuator and the load side sub-actuator, where: Expression 9

$$\alpha = \frac{J_M}{J_M + \frac{J_L}{r^2}}$$

$$\beta = \frac{B_M}{J_M + \frac{J_L}{r^2}}$$

$$\gamma = \frac{J_L}{r\left(J_M + \frac{J_L}{r^2}\right)}$$

$$\delta = \frac{B_L}{r\left(J_M + \frac{J_L}{r^2}\right)}$$

Expression 9

$J_M$ is the inertia coefficient on the driving side, $B_M$ is the viscosity coefficient on the driving side, $J_L$ is the inertia coefficient on the plant side, $B_L$ is the viscosity coefficient on the plant side, and r is the reduction ratio of the torque transfer device.

3. The control device according to claim 1, wherein the processor includes:
   a first filter configured to extract a high-frequency component from the generated torque reference input value; and
   a second filter for configured to extract a low-frequency component from the generated torque reference input value; and
the processor is configured to:
   control the main actuator and the load side sub-actuator by canceling out resonance by multiplying the high-frequency torque reference input value extracted by the first filter by each of the first gain and the second gain and thereby adjusting the torque reference input value; and
   control the main actuator by using the low-frequency torque reference input value extracted by the second filter.

4. The control device according to claim 1, wherein the processor includes:
   a first filter configured to extract a high-frequency component from the generated torque reference input value; and
   a second filter configured to extract a low-frequency component from the generated torque reference input value; and
the processor is configured to:
   control the main actuator and the load side sub-actuator by canceling out resonance by multiplying the high-frequency torque reference input value extracted by the first filter by each of a first gain ($\alpha v + \beta v/s$) and a second gain ($\gamma v + \delta v/s$) and thereby adjusting the torque reference input value;
   control the main actuator based on the low-frequency torque reference input value extracted by the second filter; and
   adjust a parameter $\alpha v$ ($0 \leq \alpha v \leq 1$), and set parameters $\beta v$, $\gamma v$ and $\delta v$ based on the adjusted parameter $\alpha v$ by using following expressions:

$$\beta_V = \frac{B_M}{J_M}\alpha_V$$

Expression 10

-continued $$\gamma_V = r(1 - \alpha_V)$$

$$\delta_V = \frac{B_L}{J_L}r(1 - \alpha_V).$$

5. The control device according to claim 3, wherein the first filter is a high-pass filter (1-F(s)), and the second filter is a low-pass filter (F(s)).

6. The control device according to claim 4, wherein after setting the parameter $\alpha v$, the processor is configured to adjust and set a cutoff frequency of the first filter and the second filter based on the set parameter $\alpha v$.

7. The control device according to claim 1, wherein the plant is a joint of a robot.

8. A control method of a control device including: (i) a main actuator configured to drive a plant through a torque transfer device disposed on a driving side, and (ii) a load side sub-actuator configured to drive the plant, the load side sub-actuator being disposed on a plant side, the method comprising:
   a step of generating a torque reference input value driving the first main actuator and the load side sub-actuator; and
   a step of canceling out resonance by multiplying the generated torque reference input value by: (i) a first gain including: an inertia coefficient, a viscosity coefficient, and a reduction ratio of the torque transfer device on the driving side and on the plant side, and (ii) a second gain including: the inertia coefficient, the viscosity coefficient, and the reduction ratio of the torque transfer device on the driving side and on the plant side, and thereby adjusting a ratio of the torque reference input value of the main actuator and the load side sub-actuator based on the canceled out resonance.

9. The control method according to claim 8, wherein the canceling step: (i) cancels out resonance by multiplying the generated torque reference input value by each of a first gain ($\alpha + \beta/s$) and a second gain ($\gamma + \delta/s$), and (ii) adjusts a ratio of the torque reference input value for the main actuator and the load side sub-actuator, where $$\alpha = \frac{J_M}{J_M + \frac{J_L}{r^2}}$$

$$\beta = \frac{B_M}{J_M + \frac{J_L}{r^2}}$$

$$\gamma = \frac{J_L}{r\left(J_M + \frac{J_L}{r^2}\right)}$$

$$\delta = \frac{B_L}{r\left(J_M + \frac{J_L}{r^2}\right)}$$

Expression 11

JM is the inertia coefficient on the driving side, BM is the viscosity coefficient on the driving side, JL is the inertia coefficient on the plant side, BL is the viscosity coefficient on the plant side, and r is the reduction ratio of the torque transfer device.

10. The control method according to claim 8, further comprising:
   a step of extracting a high-frequency component from the generated torque reference input value using a first filter; and a step of extracting a low-frequency component from the generated torque reference input value using a second filter, wherein the canceling step controls the main actuator and the load side sub-actuator by canceling out resonance by multiplying the extracted high-frequency torque reference input value by each of the first and second gains and thereby adjusting the torque reference input value; and the canceling step controls the main actuator by using the extracted low-frequency torque reference input value.

11. The control method according to claim 8, further comprising:

a step of extracting a high-frequency component from the generated torque reference input value using a first filter; and a step of extracting a low-frequency component from the generated torque reference input value using a second filter, wherein the canceling step controls the main actuator and the load side sub-actuator by canceling out resonance by multiplying the extracted high-frequency torque reference input value by each of a first gain ($\alpha v + \beta v/s$) and a second gain ($\gamma v + \delta v/s$) and thereby adjusting the torque reference input value;

the canceling step controls the main actuator based on the extracted low-frequency torque reference input value; and the canceling step adjusts a parameter $\alpha v$ ($0 \leq \alpha v \leq 1$), and sets parameters $\beta v$, $\gamma v$ and $\delta v$ based on the adjusted parameter $\alpha v$ by using following expressions:

$$\beta_V = \frac{B_M}{J_M} \alpha_V \qquad \text{Expression 12}$$

$$\gamma_V = r(1 - \alpha_V)$$

$$\delta_V = \frac{B_L}{J_L} r(1 - \alpha_V).$$

12. The control method according to claim 10, wherein the first filter is a high-pass filter (1-F(s)), and the second filter is a low-pass filter (F(s)).

13. The control method according to claim 11, wherein after setting the parameter $\alpha v$, the canceling step adjusts and sets a cutoff frequency of the first filter and the second filter based on the set parameter $\alpha v$.

14. The control method according to claim 8, wherein the plant is a joint of a robot.

15. A control program of a control device including a main actuator configured to drive a plant through a torque transfer device disposed on a driving side, and a load side sub-actuator configured to drive the plant, the load side sub-actuator being disposed on a plant side, the control program causing a computer to execute a process including;

generating a torque reference input value driving the main actuator and the load side sub-actuator; and canceling out resonance by multiplying the generated torque reference input value by: (i) a first gain including: an inertia coefficient, a viscosity coefficient, and a reduction ratio of the torque transfer device on the driving side and on the plant side, and (ii) a second gain including: the inertia coefficient, the viscosity coefficient, and the reduction ratio of the torque transfer device on the driving side and on the plant side, and thereby adjusting a ratio of the torque reference input value of the main actuator and the load side sub-actuator based on the canceled out resonance.

16. A control device comprising:

a main actuator configured to drive a plant through a torque transfer device disposed on a driving side;

a load side sub-actuator configured to drive the plant, the load side sub-actuator being disposed on a plant side; and a processor configured to:

generate a torque reference input value driving the main actuator and the load side sub-actuator;

cancel out resonance by multiplying the generated torque reference input value by: (i) a first gain including: an inertia coefficient, a viscosity coefficient, and a reduction ratio of the torque transfer device on the driving side and on the plant side, and (ii) a second gain including: the inertia coefficient, the viscosity coefficient, and the reduction ratio of the torque transfer device on the driving side and on the plant side; and adjust a ratio of the torque reference input value of the main actuator and the load side sub-actuator based on the canceled out resonance.

* * * * *